US008066788B2

(12) United States Patent
Kobayashi et al.

(10) Patent No.: US 8,066,788 B2
(45) Date of Patent: Nov. 29, 2011

(54) ENGINE GENERATOR

(75) Inventors: Takao Kobayashi, Wako (JP); Tadafumi Hirose, Wako (JP); Ryosuke Shibata, Wako (JP); Go Tanaka, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 354 days.

(21) Appl. No.: 12/485,324

(22) Filed: Jun. 16, 2009

(65) Prior Publication Data

US 2009/0320773 A1 Dec. 31, 2009

(30) Foreign Application Priority Data

Jun. 27, 2008 (JP) ................................ 2008-168656

(51) Int. Cl.
*B01D 50/00* (2006.01)
*F02M 35/024* (2006.01)

(52) U.S. Cl. .................................. 55/385.3; 123/198 E

(58) Field of Classification Search ................. 55/385.3, 55/310, 312, 313, 419, DIG. 28; 123/198 E, 123/41.62, 184.21, 54.4; 180/219, 68.1, 180/68.2, 68.3, 225, 229, 346; 280/280.1
See application file for complete search history.

(56) References Cited

U.S. PATENT DOCUMENTS

| | | | | |
|---|---|---|---|---|
| 7,393,372 | B2 * | 7/2008 | Cassell et al. | 55/310 |
| 7,776,119 | B2 * | 8/2010 | Notaras et al. | 55/385.3 |
| 7,981,179 | B2 * | 7/2011 | Nobuhira | 55/385.3 |
| 2005/0050867 | A1 * | 3/2005 | Taomo et al. | 55/385.3 |
| 2007/0220848 | A1 * | 9/2007 | Diepolder et al. | 55/385.3 |
| 2008/0053394 | A1 * | 3/2008 | Tsutsui et al. | 123/184.21 |
| 2009/0126678 | A1 * | 5/2009 | Takeuchi et al. | 123/198 E |

FOREIGN PATENT DOCUMENTS

JP 2000-213429 A 8/2000

* cited by examiner

*Primary Examiner* — Duane Smith
*Assistant Examiner* — Minh-Chau Pham
(74) *Attorney, Agent, or Firm* — Westerman, Hattori, Daniels & Adrian, LLP

(57) ABSTRACT

An engine generator including an engine, a generator and an air cleaner inside a case is disclosed. A wall section of the case is dented in the internal direction of the case to provide a filter accommodation section with a space for accommodating a filter. The space has an opening that opens toward the exterior of the case. The filter accommodation section has an outside-air intake port. The opening is blocked by an air cleaner cover.

5 Claims, 15 Drawing Sheets

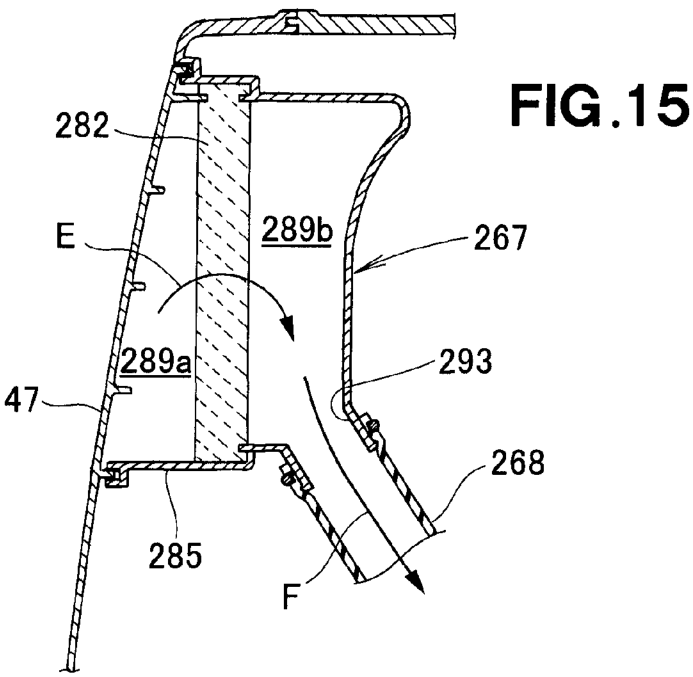
FIG.15
FIG.16
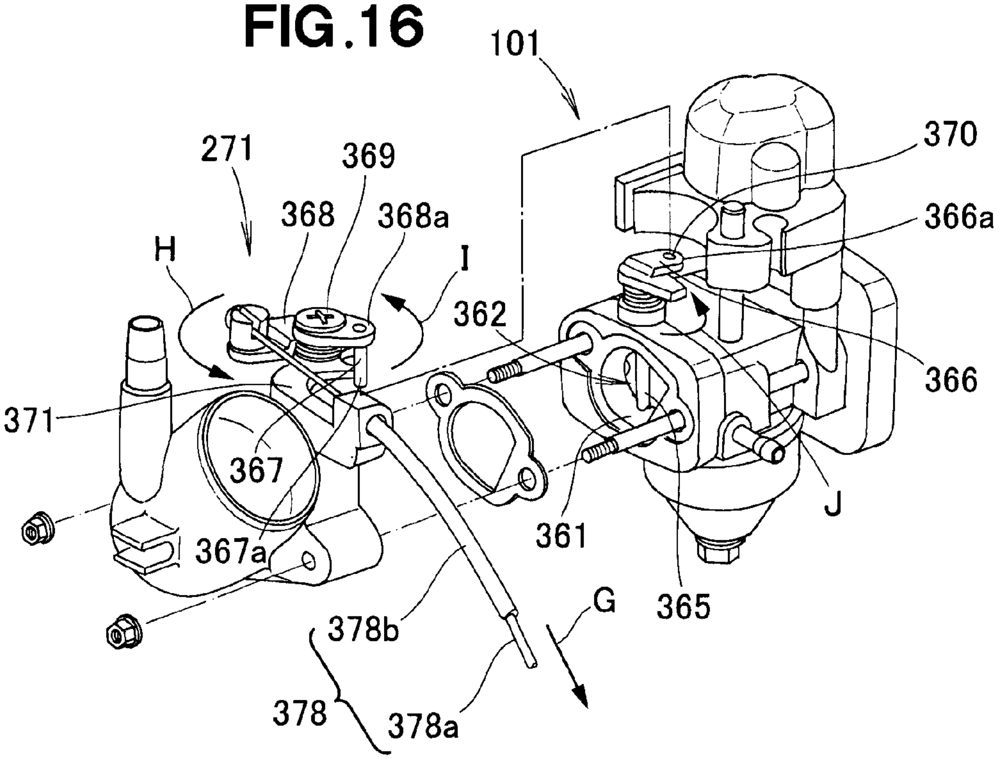

ENGINE GENERATOR

FIELD OF THE INVENTION

The present invention relates to an engine generator (engine/generator unit) having an air cleaner inside a case in which an engine and a generator are accommodated.

BACKGROUND OF THE INVENTION

An air-cooled multipurpose engine having an air cleaner on a fan cover that covers a cooling fan is already known as disclosed in, for example, Japanese Patent Application Laid-Open Publication No. 2000-213429.

An air-cleaner case of the air cleaner is integrally formed on the fan cover. A filter is placed inside the case via an opening in the air-cleaner case. The opening is covered by an air-cleaner cover.

When such an engine is used as, e.g., an engine generator, the engine, the cooling fan, the generator, the air cleaner, and the like must be accommodated inside an external case in order to ensure transportability or the like.

Ordinarily, a maintenance cover is provided for performing maintenance on the components inside the external case.

However, the air cleaner disclosed in the 2000-213429 publication has an air cleaner accommodated inside the air-cleaner case integrally formed with the fan cover, and the opening is covered by the air cleaner cover. Accordingly, when the air-cleaner cover is to be replaced, the maintenance cover disposed in the vicinity of the air-cleaner cover is first detached and the opening of the external case is exposed. Next, a worker inserts his hand into the external case through the opening in the external case, removes the air-cleaner cover from the air-cleaner case, and exposes the opening of the air-cleaner cover. The filter is then removed from the exposed opening and replaced with a new filter.

In other words, two covers, i.e., an air-cleaner cover and a maintenance cover, are required in the case that the air-cooled multipurpose engine is used as an engine generator or the like. Accordingly, time is required to perform maintenance on the air cleaner or to replace the filter, resulting in a hindrance to reducing the weight of the engine generator.

SUMMARY OF THE INVENTION

It is therefore an object of the present invention to provide an engine generator that allows the air cleaner to be readily maintained, the filter to be replaced, and a reduction in weight to be assured.

According to an aspect of the present invention, there is provided an engine generator which comprises: an engine; a generator driven by the engine; a case for accommodating the engine and the generator; and an air cleaner for taking outside air into the case and performing filtering in order to direct the outside air to the engine, wherein the air cleaner comprises: a filter accommodation section with a space defined by a portion of a wall section of the case dented in the internal direction of the case, the space having an opening that opens toward the exterior of the case; a filter accommodated in the space; an outside-air intake port for introducing outside air into the filter accommodation section, being provided to a lower location of the filter in the filter accommodation section; and an air cleaner cover for blocking the opening of the filter accommodation section.

Accordingly, a single air cleaner cover can be used instead of the two covers that are conventionally required. As a result, the opening of the filter accommodation section can be opened merely by removing the air cleaner cover. Therefore, air cleaner maintenance can be readily performed merely by removing the air cleaner cover.

Furthermore, the filter can be removed from the opening and replaced with a new filter merely by removing the air cleaner cover, and the air cleaner filter can be readily replaced. Additionally, since a single air cleaner cover can be used instead of the two covers that are conventionally required, the number of components can be reduced and the weight of the engine generator can be reduced.

Preferably, the filter accommodation section is integrally formed in the wall section of the case.

It is preferable that having the wall section of the case concavely formed causes the space of the filter accommodation section to assume a rectangular shape formed by an upper wall section, a lower wall section, a left wall section, a right wall section, and a bottom wall section.

Desirably, the filter accommodation section has an outside-air outlet for directing outside air filtered by the filter to the engine.

In a preferred form, the filter be disposed between the outside-air intake port and the outside-air outlet.

BRIEF DESCRIPTION OF THE DRAWINGS

A preferred embodiment of the present invention will be described in detail below, by way of example only, with reference to the accompanying drawings, in which:

FIG. 15 shows an example of directing outside air into a third intake channel of FIG. 10; and FIG. 16 shows an example of operating a choke valve of FIG. 13.

DETAILED DESCRIPTION OF THE PREFERRED EMBODIMENT

In the inventive embodiment to be described below, the term "forward direction" is meant to be a direction in which an engine generator (engine/generator unit) 10 is pulled by a draw handle 125.

Figure 1:
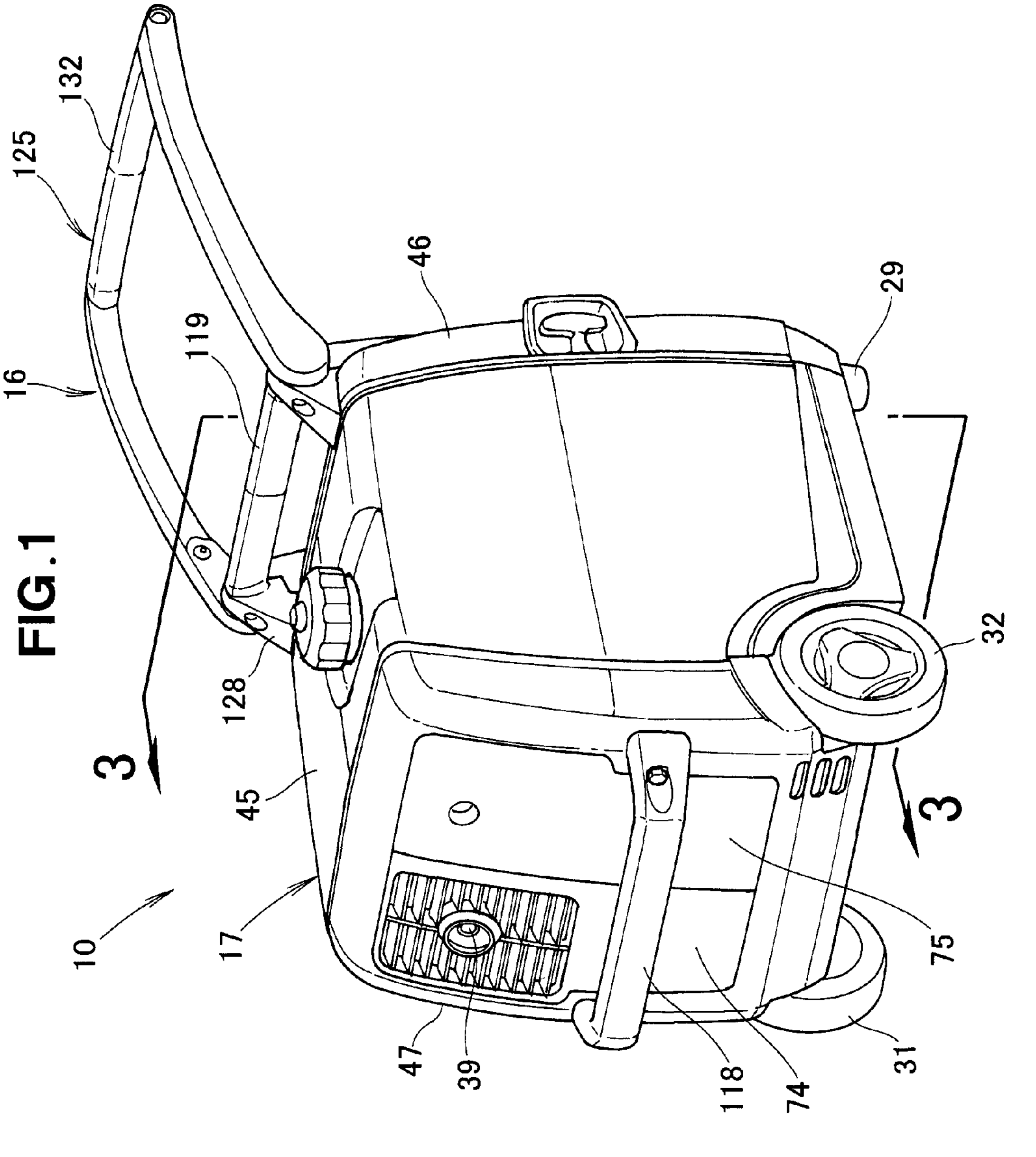
FIG. 1 is a perspective view showing an engine generator according to an embodiment of the present invention.
Figure 2:
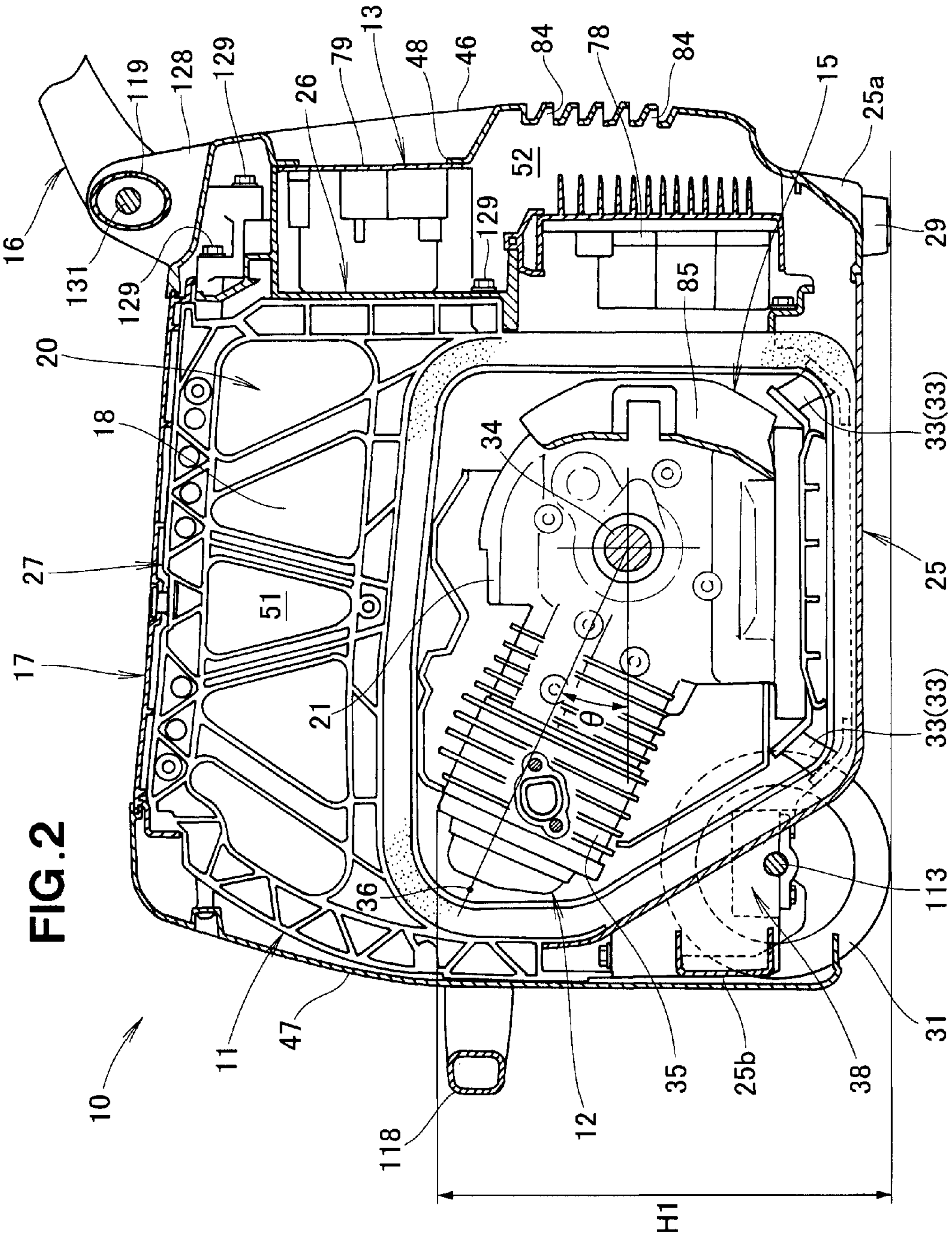
FIG. 2 is a longitudinal sectional view of the engine generator of FIG. 1.

As shown in FIGS. 1 and 2, the engine generator 10 is provided with a skeletal member 11 that forms a main skeletal body, an engine/generator unit 12 provided to the skeletal member 11, an electrical component section 13 for controlling the output of the engine/generator unit 12, an intake/fuel feed mechanism 14 (see FIG. 3) for feeding fuel to the engine/generator unit 12, a cooling structure 15 for directing cooling air to the engine/generator unit 12, a transport structure 16 for transporting the engine generator 10; a case 17 for covering the engine/generator unit 12 and the electrical component section 13, an insulating material 18 for partitioning accommodation space 20 inside the case 17, and a muffler 23 (see FIG. 3) provided to an engine 21 of the engine/generator unit 12.

Left and right leg sections 29 are provided to a front-end part 25*a* of a bottom cover 25 of the skeletal member 11, and left and right wheels 31, 32 are provided to a rear-end part 25*b*. The left and right leg sections 29 are each formed using a rubber member. The bottom cover 25 is essentially horizontal in a state in which the left and right leg sections 29 and the left and right wheels 31, 32 are in contact with the ground. The skeletal member 11 will be described with reference to FIG. 4.

The engine/generator unit 12 is mounted on the bottom cover 25 of the skeletal member 11 via four mounting members (mount members) 33.

The engine/generator unit 12 is integrally provided with an engine 21 and a generator 22 (see FIG. 3) driven by the engine 21.

Figure 3:
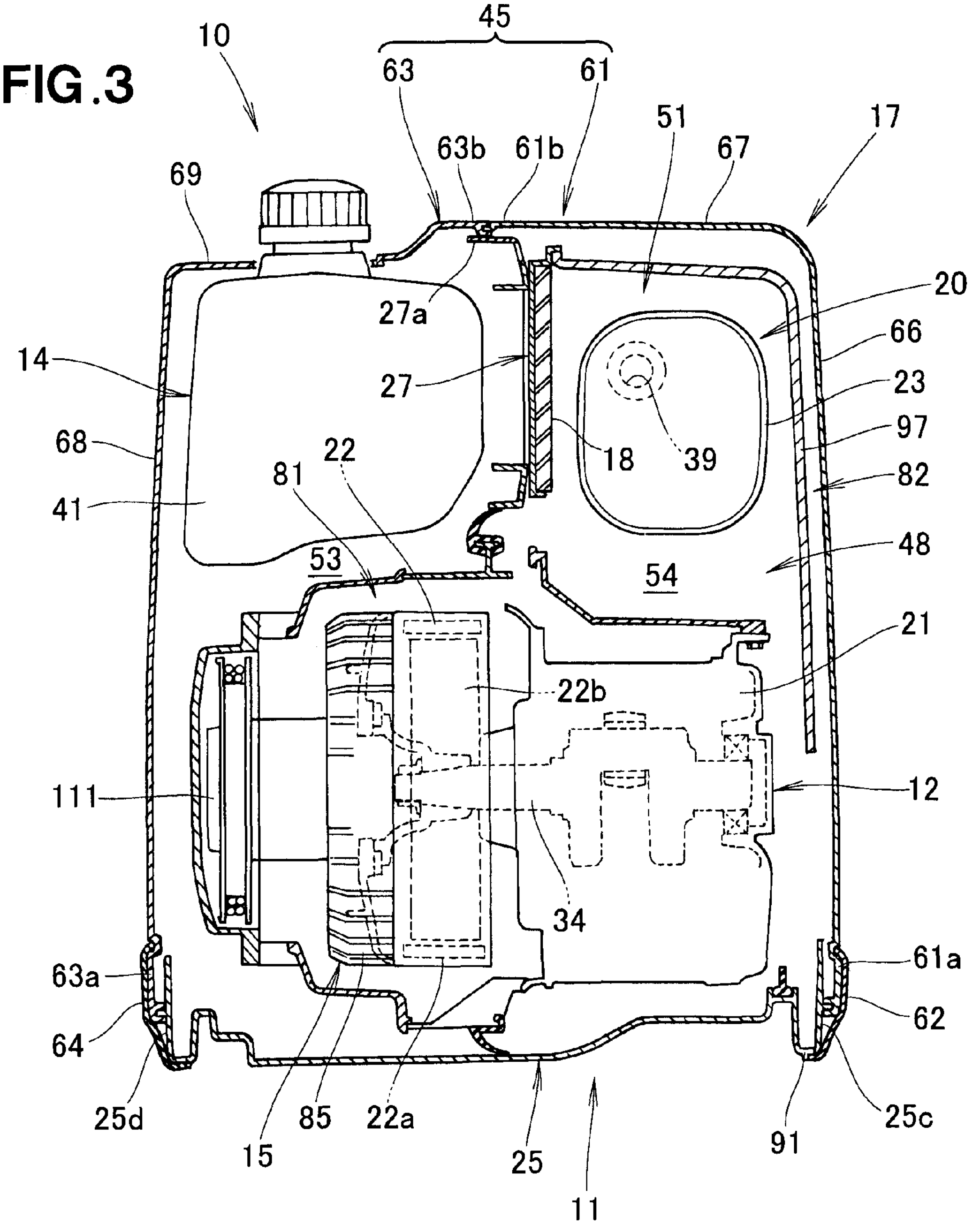
FIG. 3 is a cross-sectional view taken along line 3-3 of FIG. 1.

The generator 22 is coaxially provided to a drive shaft (crankshaft) 34 of the engine 21 (see FIG. 3).

A cylinder block 35 of the engine 21 is disposed in a state inclined at an angle θ from the drive shaft 34 to the left and right wheels 31, 32 (specifically the shaft 113 for supporting the left and right wheels 31, 32). Reference numeral 36 shown in FIG. 2 shows the cylinder center of the cylinder block 35.

The height H1 of the engine 21 can be kept low by inclining the cylinder block 35 of the engine 21 at the angle θ. The height of the engine generator 10 can be kept low and the engine generator 10 made more compact by keeping the height H1 of the engine 21 low.

A wheel accommodation space 38 can be provided below the cylinder block 35 in a state in which the cylinder block 35 of the engine 21 is inclined at the angle θ. The left and right wheels 31, 32 are disposed in the wheel accommodation space 38. A more compact engine generator 10 can be even more adequately assured by disposing the left and right wheels 31, 32 in a wheel accommodation space 38.

Fuel (air-fuel mixture) from the intake/fuel feed mechanism 14 is fed to the engine 21. The intake/fuel feed mechanism 14 will be described with reference to FIGS. 4 to 13.

The electrical component section 13 controls the output of the engine/generator unit 12, the electrical component section 13 being provided with a control panel 79 in the upper half section, and an inverter unit 78 in the lower half section. A switch for starting the engine, and an AC terminal, a DC terminal, or the like for outputting generated power is provided to the control panel 79 so as to face outward from an opening 48 in the front case section 46. The inverter unit 78 controls the output frequency of the generator 22.

The engine/generator unit 12 is mounted on the bottom cover 25 in a state in which the drive shaft 34 of the engine 21 is laterally disposed facing the left/right direction. The drive shaft 34 of the engine/generator unit 12 is made to rotate by the driving of the engine 21. The rotation of the drive shaft 34 is transmitted to a cooling fan 85 and the cooling fan 85 rotates. The rotation of the cooling fan 85 causes a rotor 22*a* of the generator 22 to rotate along the external periphery of a stator 22*b*. The rotation of the rotor 22*a* generates power.

The muffler 23 is provided above the engine 21 of the engine/generator unit 12. The muffler 23 discharges exhaust gas from the cylinder block 35 (FIG. 2) of the engine 21 via an exhaust port 39 (see FIG. 1).

A fuel tank 41 of the intake/fuel feed mechanism 14 is provided above the generator 22 of the engine/generator unit 12.

The engine/generator unit 12, the muffler 23, and the fuel tank 41 are accommodated inside the case 17 formed to be substantially U-shaped in cross-section. The case 17 is formed from polypropylene (PP) or another resin, and is provided with a main case 45, a front case section 46, and the rear case section 47, as shown in FIG. 1. An accommodation space 20 is formed by the case 17 and the bottom cover 25 by disposing the case 17 above the bottom cover 25.

The accommodation space 20 is partitioned into a unit accommodation area 51 and an electrical component accommodation area 52 (see FIG. 2). The unit accommodation area 51 is partitioned into a cool area 53 and a hot area 54. The engine/generator unit 12 is accommodated in the unit accommodation area 51 and the electrical component section 13 (FIG. 2) is accommodated in the electrical component accommodation area 52. The engine 21 and the muffler 23 are accommodated in the hot area 54; and the generator 22, the fuel tank 41, the cooling fan 85, and a coil starter 111 are accommodated in the cool area 53.

The main case 45 covers the left and right side sections of the unit accommodation area 51. The main case 45 is provided with a left side case section 61 for covering the hot area 54, a decorative left cover 62 provided to the lower section of the left side case section 61, the right side case section 63 for covering the cool area 53, and a decorative right cover 64 provided to the lower section of the right side case section 63.

A lower end section 61*a* of the left side case section 61 is mounted on a left side section 25*c* of the bottom cover 25, and an upper end section 61*b* is mounted on an upper section 27*a* of the skeletal member 11 (center frame 27). The left side case section 61 is formed substantially to be L-shaped in cross-section by a left-side wall section 66 and a right upper wall section 67.

A lower end section 63*a* of the right side case section 63 is mounted on a right-side section 25*d* of the bottom cover 25, and an upper end section 63*b* is mounted on the upper section 27*a* of the skeletal member 11 (center frame 27). The right side case section 63 is formed substantially to be L-shaped in cross-section by a right-side wall section 68 and a right upper wall section 69.

An upper wall section of the case 17 is composed of the right upper wall section 67 of the left side case section 61 and the right upper wall section 69 of the right side case section 63.

Referring again to FIGS. 1 and 2, the front case section 46 is formed into a substantially rectangular lid, is mounted on the bottom cover 25 of the skeletal member 11 or on a perpendicular frame 26 or the like, and constitutes the front wall section of the case 17. The front section of the electrical component accommodation area 52 is covered by the front case section 46.

The rear case section 47 is formed into a substantially rectangular lid, is mounted on the bottom cover 25 of the skeletal member 11 or on the center frame 27 or the like, and constitutes the rear wall section of the case 17. The rear section of the unit accommodation area 51 is covered by the rear case section 47. The rear case section 47 has a left-cover section 74 on the left half section and a right-cover section (air cleaner cover) 75 on the right half section.

Referring again to FIG. 3, the cooling structure 15 is provided with a case cooling structure 82 for cooling the case 17, and an engine cooling structure 81 for cooling the inverter unit 78 (FIG. 2) of the electrical component section 13, the engine 21, and the muffler 23.

In accordance with an engine cooling structure 81, outside air is introduced from an intake louver section 84 shown in FIG. 2, and introduced to the inverter unit 78 (FIG. 2), the engine 21, and the muffler 23, whereby the inverter unit 78, the engine 21, and the muffler 23 are cooled by the outside air.

In accordance with a case cooling structure 82, outside air is introduced from an intake slit section 91 and directed along the inner surface of the left side case section 61 and the inner surface of the right side case section 63, whereby the left and right side case sections 61, 63 are cooled by the outside air.

Figure 4:
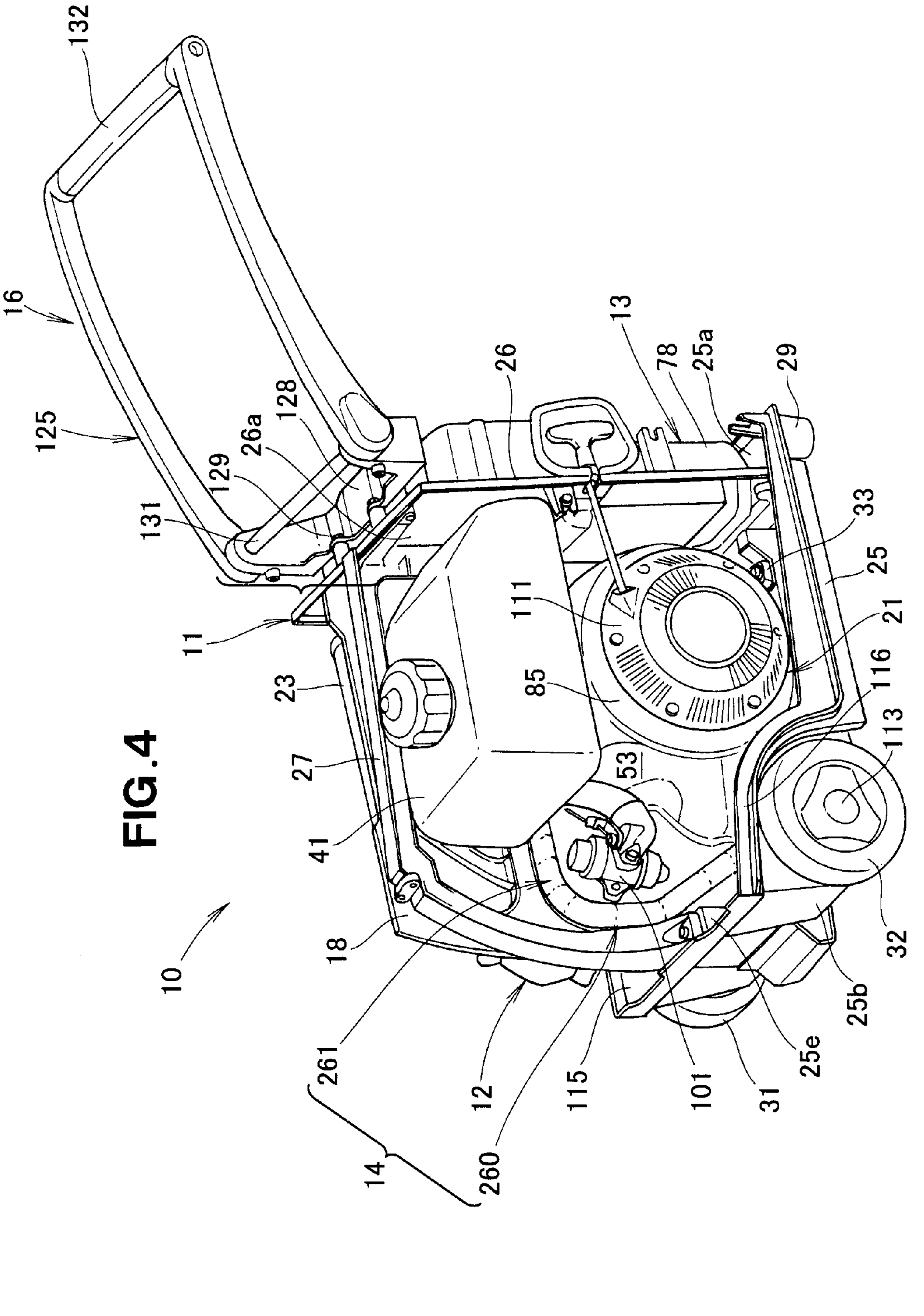
FIG. 4 is a perspective view showing the engine generator of FIG. 1 with a case removed.

The skeletal member 11 is composed of the bottom cover 25 for supporting the engine/generator unit 12, the perpendicular frame 26 disposed upright in the vicinity of the front-end part 25*a* of the bottom cover 25, and the center frame 27 that extends between an upper section center 26*a* of the perpendicular frame 26 and a rear end center section 25*e* of the bottom cover 25, as shown in FIGS. 2, 3, and 4.

A recoil starter 111 is provided to the engine 21. The exhaust muffler 23 is provided above the engine 21.

The insulating material 18 is provided to the center frame 27. The insulating material 18 partitions the cool area 53 and the hot area 54 (FIG. 3).

The left and right wheels 31, 32 of the engine generator 10 are rotatably mounted on the bottom cover 25 of the skeletal member 11 via the shaft 113. In other words, left and right wheel housings 115, 116 are formed in the left and right end sections in the rear-end part 25*b* of the bottom cover 25. The left and right wheel housings 115, 116 bulge upward in a substantially curved shape so as to allow the left and right wheels 31, 32 to be accommodated. The left wheel 31 is disposed below the left wheel housing 115, and the right wheel 32 is disposed below the right wheel housing 116.

A rear stationary handle 118 of the transport structure 16 shown in FIG. 1 is provided to the rear-end part 25*b* of the bottom cover 25 via left and right handle support sections (not shown).

The draw handle 125 is provided to the perpendicular frame 26. Specifically, the draw handle 125 is swingably supported in the vertical direction at the upper section center 26*a* of the perpendicular frame 26 via a handle support section 128. The handle support section 128 is fastened together with the center frame 27 by a plurality of bolts 129 in the upper section center 26*a* of the perpendicular frame 26.

The transport structure 16 is provided with left and right wheels 31, 32, the rear stationary handle 118, a front stationary handle 119 (FIGS. 1 and 2), and the draw handle 125. The front stationary handle 119 is provided so as to cover a support shaft 131 of the draw handle 125, as shown in FIG. 2.

In accordance with the transport structure 16, the draw handle 125 is swung upward about the support shaft 131 to a draw position (the state shown in FIG. 4), a grip 132 of the draw handle 125 is gripped, and the engine generator 10 is pulled. In other words, gripping and lifting the grip 132 causes the left and right leg sections 29 to be lifted off the ground. Pulling the grip 132 in this state enables the left and right wheels 31, 32 to rotate and the engine generator 10 to be transported.

The draw handle 125 swings downward about the support shaft 131 and the draw handle 125 is secured to the front case section 46 (FIG. 1). In this state, the rear stationary handle 118 and the front stationary handle 119 are gripped, and the engine generator 10 is lifted and transported.

Next, the intake/fuel feed mechanism 14 will be described.

The intake/fuel feed mechanism 14 feeds fuel (air-fuel mixture) to the engine 21 (FIG. 3) of the engine/generator unit 12. The intake/fuel feed mechanism 14 is provided with an intake structure 260 for drawing in and filtering outside air, and a fuel feed structure 261 for mixing fuel with outside air drawn in by the intake structure 260.

The fuel feed structure 261 is provided with a fuel tank 41 disposed above the generator 22 (FIG. 3), and a carburetor 101 provided to the cylinder block 35 (FIG. 2) of the engine 21. The fuel tank 41 is a tank for holding fuel to be fed to the engine. The carburetor 101 is a component for mixing fuel brought from the fuel tank 41 with air brought from the air cleaner (not shown) and feeding the air-fuel mixture to the engine 21. The fuel tank 41 and the carburetor 101 are disposed in the area to the right of the center frame 27 (insulating material 18), i.e., in the cool area 53. The engine 21 and the muffler 23 are disposed in the area to the left of the center frame 27 (insulating material 18), i.e., in the hot area 54 (FIG. 3).

Figure 5:
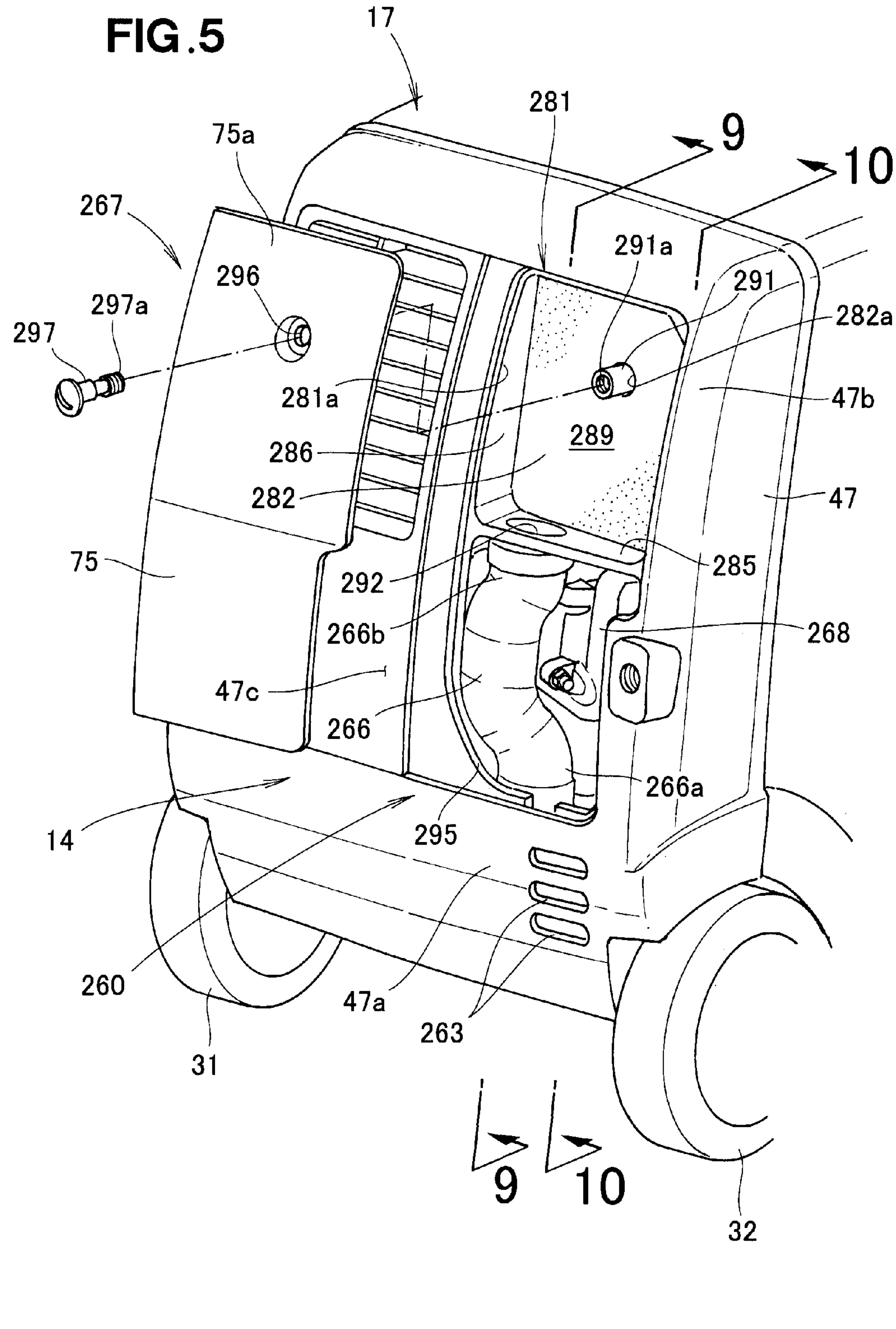
FIG. 5 is an exploded perspective view of an intake/fuel-feed mechanism of FIG. 4 as seen from the exterior of the case.
Figure 6:
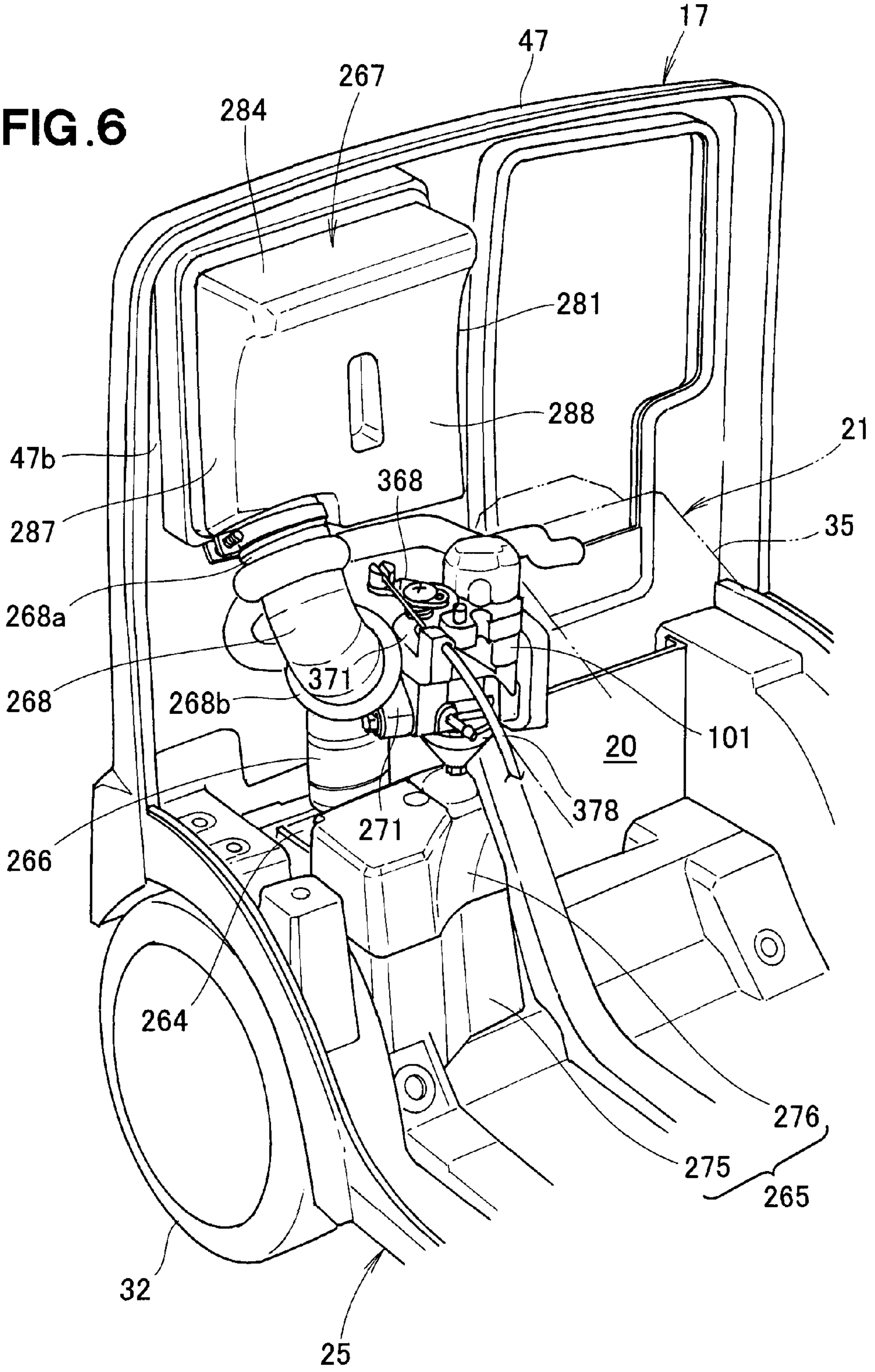
FIG. 6 is a perspective view of the intake/fuel-feed mechanism of FIG. 5 as seen from the interior of the case.

As shown in FIGS. 5 and 6, the intake structure 260 is provided with intake ports 263 opened to the exterior of the case 17, a first intake channel 264 that is in communication with the intake ports 263, a resonator 265 that is in communication with the first intake channel 264, a second intake channel 266 that is in communication with the first intake channel 264, an air cleaner 267 that is in communication with the second intake channel 266, a third intake channel 268 that is in communication with the air cleaner 267, and an intake joint section 271 (see FIG. 12) that places the third intake channel 268 in communication with the carburetor 101.

The intake ports 263 are in communication with a lower end opening 273 (see FIG. 7) of the first intake channel 264 at an outside-air intake port provided to a right-side lower wall section 47*a* of the rear case section 47.

The first intake channel 264 is formed from a part of a partitioning wall section 275 formed in the bottom cover 25 and a part of a cover section 276 superimposed on the partitioning wall section 275. The partitioning wall section 275 is integrally formed with the bottom cover 25. The first intake channel 264 will be described with reference to FIGS. 7 and 8.

The second intake channel 266 is disposed in a vertical orientation between the first intake channel 264 and the air cleaner 267, a lower end opening 266*a* is provided to an upper end opening 264*a* (see FIG. 7) of the first intake channel 264, and an upper end opening 266*b* is provided to a lower wall section 285 of the air cleaner 267.

The air cleaner 267 is provided with the filter accommodation section 281 formed in a right-side upper wall section 47*b* (wall section of the case) of the rear case section 47, a filter 282 accommodated inside the filter accommodation section 281, and the right-cover section 75 (air cleaner cover) for blocking an opening 281*a* of the filter accommodation section 281.

The filter accommodation section 281 is concavely formed in the accommodation space 20 inside the case 17 in the right-side upper wall section 47*b* of the rear case section 47, whereby a filter accommodation space 289 is formed by the upper and lower wall sections 284, 285, left and right wall sections 286, 287, and a bottom wall section 288 in a substantially rectangular shape as viewed from the rear surface; and has an opening 281*a* formed so as to open the filter accommodation space 289 to the exterior of the rear case section 47.

In other words, the filter accommodation section 281 is integrally formed concave in the forward direction in the rear case section 47.

The filter accommodation section 281 has a boss 291 protruding into the filter accommodation space 289 in substantially the center of the bottom wall section 288, a screw hole 291*a* formed in the boss 291, an outside-air intake port 292 formed in the vicinity of the opening 281*a* of the lower wall section 285, and an outside-air outlet 293 (see FIG. 10) formed in the vicinity of the bottom wall section 288 of the lower wall section 285.

The outside-air intake port 292 is in communication with the upper end opening 266*b* of the second intake channel 266 and is an opening for bringing outside air directed by the second intake channel 266 to the filter accommodation space 289.

Figure 10:
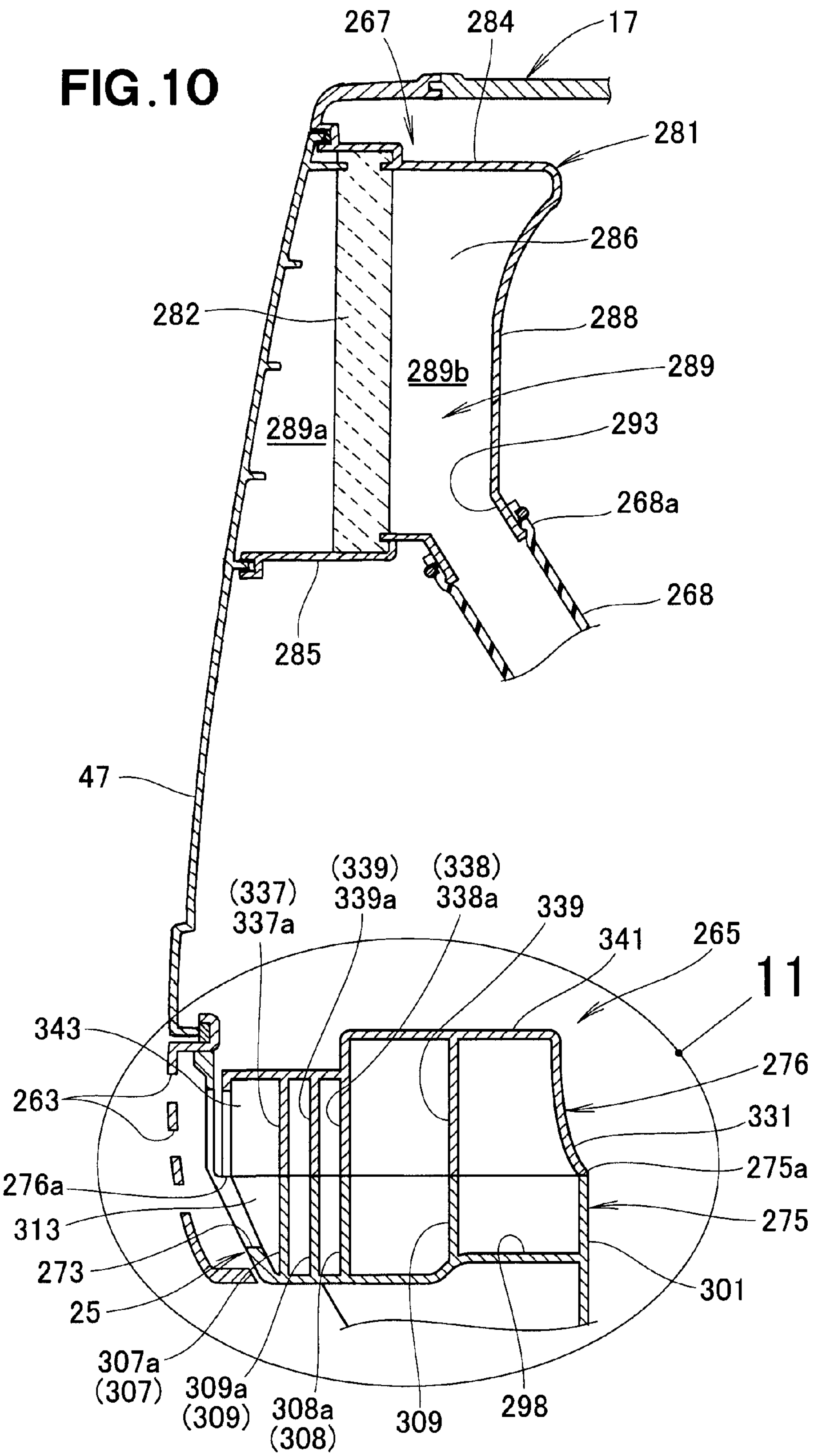
FIG. 10 is a cross-sectional view taken along line 10-10 of FIG. 5.

The outside-air outlet 293 shown in FIG. 10 is in communication with an upper end opening 268*a* of the third intake channel 268, and is an opening for bringing outside air filtered inside the filter accommodation space 289 to the third intake channel 268.

The filter 282 is disposed (see FIG. 9) in a predetermined space, parallel to the bottom wall section 288 in the filter accommodation space 289 and facing the bottom wall section 288. The filter 282 filters outside air directed from the intake ports 263. The filter 282 is formed in a substantially rectangular shape so as to make contact with the upper and lower wall sections 284, 285 and the left and right wall sections 286, 287 of the filter accommodation section 281, and has a through-hole 282*a* formed so as to pass through substantially the center of the boss 291.

Figure 9:
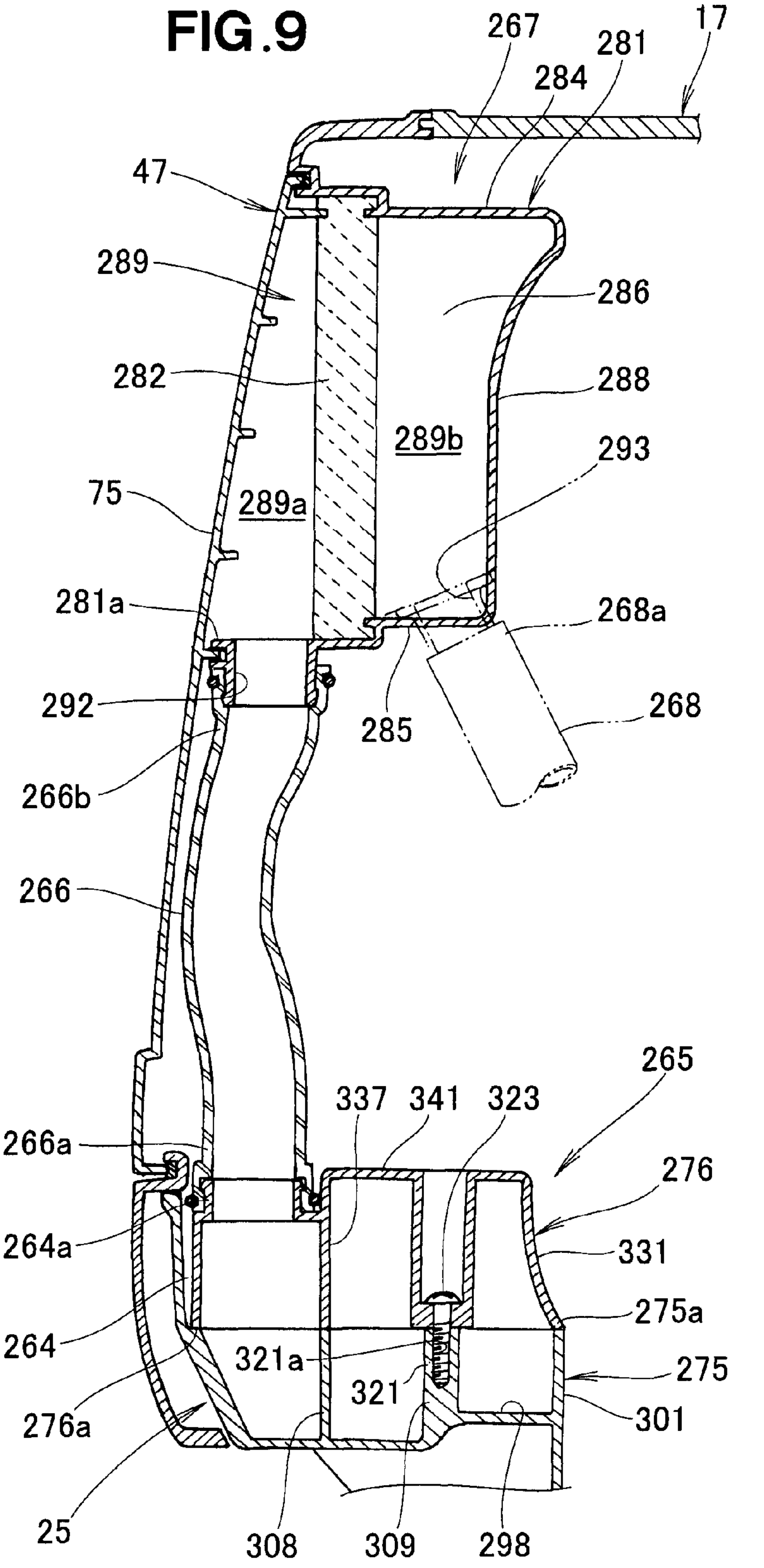
FIG. 9 is a cross-sectional view taken along line 9-9 of FIG. 5.

The filter 282 is disposed between the outside-air intake port 292 and the outside-air outlet 293 in the forward/rearward direction of the engine generator 10, as shown in FIG. 9. Accordingly, the filter accommodation space 289 is partitioned (see FIG. 9) by the filter 282 into an introduction space 289*a* of the outside-air intake port 292 and an outlet space 289*b* of the outside-air outlet 293.

The outside-air intake port 292 is provided to the lower wall section 285, as described above. Accordingly, the outside-air intake port 292 is provided to a lower location of the filter 282. The filter 282 can thereby be replaced in a simple manner with little labor without interference from the outside-air intake port 292 when the filter 282 is removed and replaced with a new filter 282.

The opening 281*a* of the filter accommodation section 281 is blocked by the right-cover section 75. The right-cover section 75 is formed in a substantially rectangular shape so as to cover the opening 281*a* of the filter accommodation section 281 and a maintenance opening 295 below the opening 281*a*. The right-cover section 75 has a mounting hole 296 in the vicinity of an upper section 75*a*.

A bolt 297 is inserted from the rear into the mounting hole 296, and a screw section 297*a* protruding from the mounting hole 296 is threadably coupled to the screw hole 291*a* of the boss 291, whereby the right-cover section 75 is mounted on the right half section of the rear case section 47. The opening 281*a* and the maintenance opening 295 are kept in a state of being blocked by the right-cover section 75 by mounting the right-cover section 75 onto the rear case section 47.

The right-cover section 75 is mounted flush with the surface 47*c* of the rear case section 47 in a state in which the right-cover section 75 is mounted on the right half section of the rear case section 47.

The filter accommodation section 281 is integrally formed so as to be concave from the rear case section 47 toward the accommodation space 20 (i.e., the forward side), as described above. Accordingly, the air cleaner 267 is disposed inside the case 17.

Outside air is directed to the introduction space 289*a* (see FIG. 9) from the outside-air intake port 292 in a state in which the opening 281*a* and the maintenance opening 295 are blocked by the right-cover section 75. The outside air thus directed is filtered by the filter 282 and flows to the outlet space 289*b* (see FIG. 9). The outside air that has flowed to the outlet space 289*b* passes through the outside-air outlet 293 (see FIG. 10) and is directed to the third intake channel 268.

The third intake channel 268 is arranged in a substantially vertical orientation between the lower wall section 285 of the air cleaner 267 and the carburetor 101. The upper end opening 268*a* is provided to the lower wall section 285 (outside-air outlet 293 (see FIG. 10) of the air cleaner 267, and a lower end opening 268*b* is connected to the carburetor 101 via the intake joint section 271.

In this manner, the right-cover section 75 blocks the opening 281*a* of the filter accommodation section 281. Accordingly, two covers that are conventionally required can be reduced to a single right-cover section 75. The opening 281*a* of the filter accommodation section 281 can thereby be opened merely by removing the right-cover section 75. Therefore, maintenance of the air cleaner 267 can be readily performed merely by removing the right-cover section 75.

Furthermore, the filter 282 can be removed from the opening 281*a* and replaced with a new filter 282 merely by removing the right-cover section 75. The filter 282 of the air cleaner 267 can thereby be readily replaced.

Two covers that are conventionally required can be reduced to a single right-cover section 75, whereby the number of components can be reduced. The weight of the engine generator 10 can be made more lightweight by reducing the number of components.

The intake joint section 271 will be described with reference to FIGS. 12 and 13.

Figure 7:
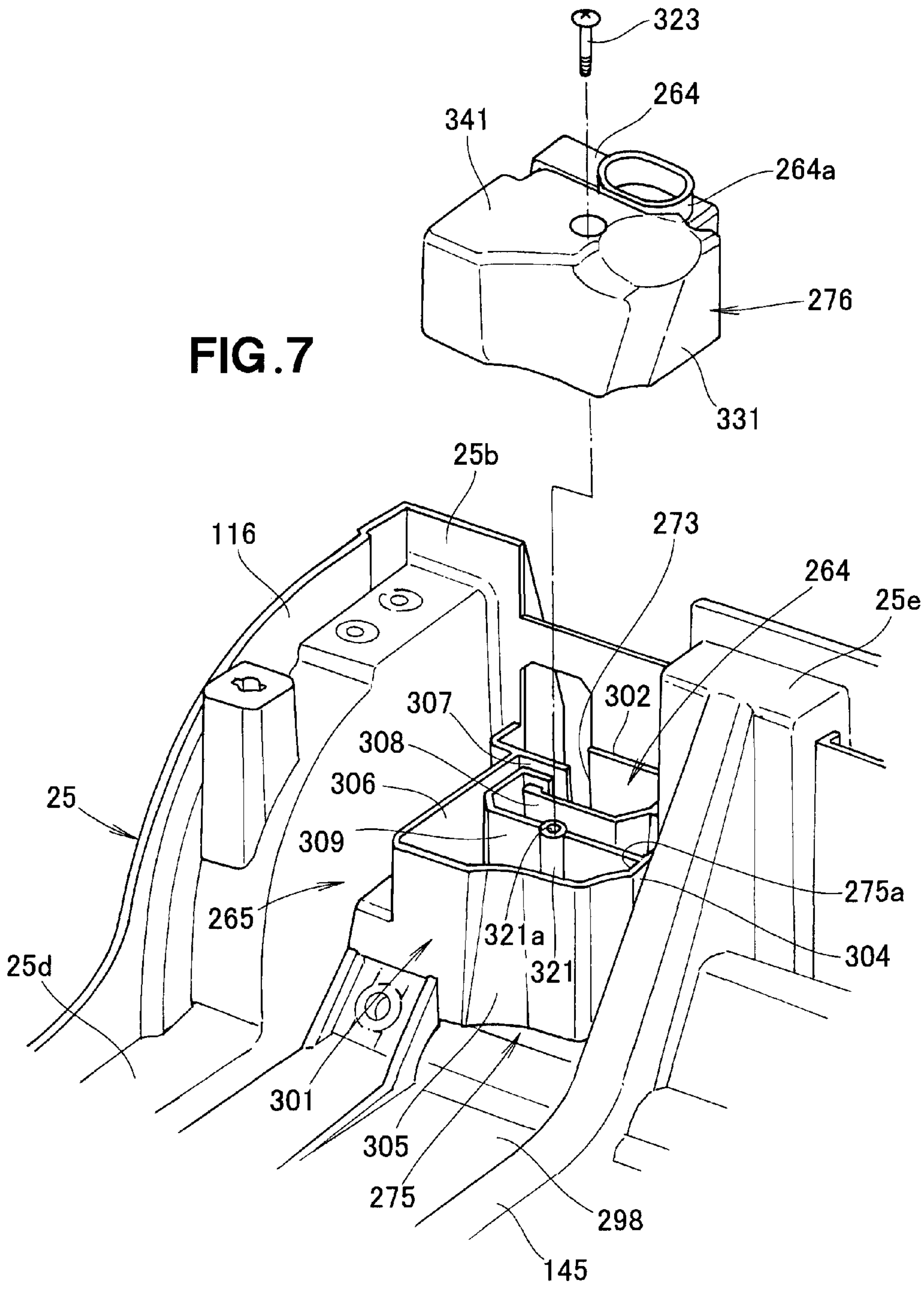
FIG. 7 is an exploded perspective view showing a resonator of the intake/fuel-feed mechanism.
Figure 8:
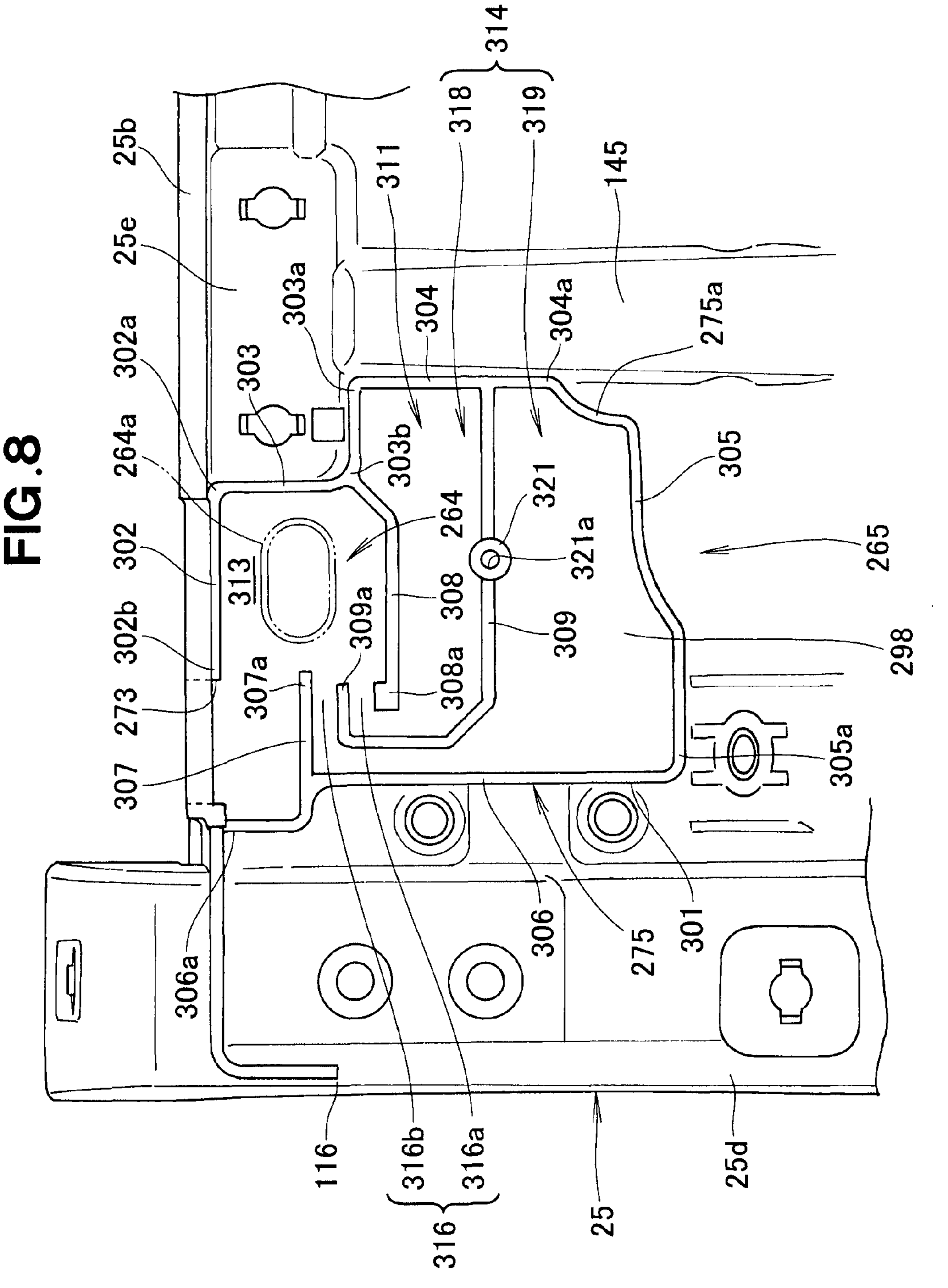
FIG. 8 is a top plan view of the resonator of FIG. 7.

The first intake channel 264 is formed from a part of a partitioning wall section 275 integrally formed in the bottom cover 25 and a part of a cover section 276 superimposed on the partitioning wall section 275, as shown in FIGS. 7 and 8. The resonator 265 in communication with the first intake channel 264 is formed by the remaining part of the partitioning wall section 275 and the remaining part of the cover section 276.

The bottom cover 25 has the partitioning wall section 275 provided to the right side of a center vertical rib 145 in the rear-end part 25*b*. The center vertical rib 145 is a reinforcement rib that extends rectilinearly from the front-end part 25*a* (FIG. 4) toward the rear-end part 25*b* in the width direction center of the bottom cover 25.

The partitioning wall section 275 is provided with a lower outside frame wall 301 disposed upright from a bottom surface 298 inside the bottom cover 25, and first to third lower inside walls 307 to 309 disposed upright from the bottom surface 298 inside the lower outside frame wall 301. The partitioning wall section 275 is formed by the lower outside frame wall 301 and the bottom surface 298 in a box shape having an upper opening 275*a*.

The lower outside frame wall 301 is provided with a first lower outside wall 302 formed along the rear-end part 25*b* of the bottom cover 25, a second lower outside wall 303 formed from a left end section 302*a* of the first lower outside wall 302 along the rear end center section 25*e* of the bottom cover 25, a third lower outside wall 304 formed from a left end section 303*a* of the second lower outside wall 303 along the center vertical rib 145, a fourth lower outside wall 305 formed from a front-end section 304*a* of the third lower outside wall 304 toward the left side section 25*d* (right wheel housing 116) of the bottom cover 25, and a fifth lower outside wall 306 formed from the right end section 305*a* of the fourth lower outside wall 305 toward the rear-end part 25*b* of the bottom cover 25. A lower space 311 is formed by the first to fifth lower outside walls 302-306 (i.e., lower outside frame wall 301).

A rear-end section 306*a* of the fifth lower outside wall 306 is connected to the rear-end part 25*b* of the bottom cover 25. The lower end opening 273 of the first intake channel 264 is formed between the rear-end section 306*a* of the fifth lower outside wall 306 and a right end section 302*b* of the first lower outside wall 302. The lower end opening 273 faces the intake ports 263 (FIG. 5) formed in the right-side lower wall section 47*a* (FIG. 5) of the rear case section 47 (FIG. 6). Accordingly, the outside air introduced from the intake ports 263 is directed to the lower space 311 by way of the lower end opening 273.

The first lower inside wall 307 extends parallel to the rear-end part 25*b* of the bottom cover 25 from the vicinity of the rear-end section 306*a* of the fifth lower outside wall 306 toward the second lower outside wall 303. The first lower inside wall 307 is disposed in a position facing the lower end opening 273.

The second lower inside wall 308 extends substantially parallel to the rear-end part 25*b* of the bottom cover 25 from a corner section 303*b* of the second lower outside wall 303 toward the fifth lower outside wall 306. A distal end section 308*a* of the second lower inside wall 308 is in a position facing a distal end section 307*a* of the first lower inside wall 307.

The lower space 311 inside the lower outside frame wall 301 is partitioned into a first lower intake channel 313 and a lower resonance chamber 314 by the first lower inside wall 307 and the second lower inside wall 308. The first lower intake channel 313 and the lower resonance chamber 314 are in communication with each other by way of a lower communication channel 316 between the distal end section 307*a* of the first lower inside wall 307 and the distal end section 308*a* of the second lower inside wall 308.

The third lower inside wall 309 is a substantially L-shaped wall section provided in the vicinity of the front-end section 304*a* of the third lower outside wall 304. The third lower inside wall 309 is formed between the second lower inside wall 308 and the fourth lower outside wall 305. A distal end section 309*a* of the third lower inside wall 309 is positioned between the distal end section 307*a* of the first lower inside wall 307 the distal end section 308*a* of the second lower inside wall 308.

The lower resonance chamber 314 is partitioned into a first lower resonance chamber 318 and a second lower resonance chamber 319 by the third lower inside wall 309. Similarly, the lower communication channel 316 is partitioned into a first lower communication channel 316*a* and a second lower communication channel 316*b*. Accordingly, the first lower resonance chamber 318 is in communication with the first lower intake channel 313 by way of the first lower communication channel 316*a*, and the second lower resonance chamber 319 is in communication with the first lower intake channel 313 by way of the second lower communication channel 316*b*.

Figure 11:
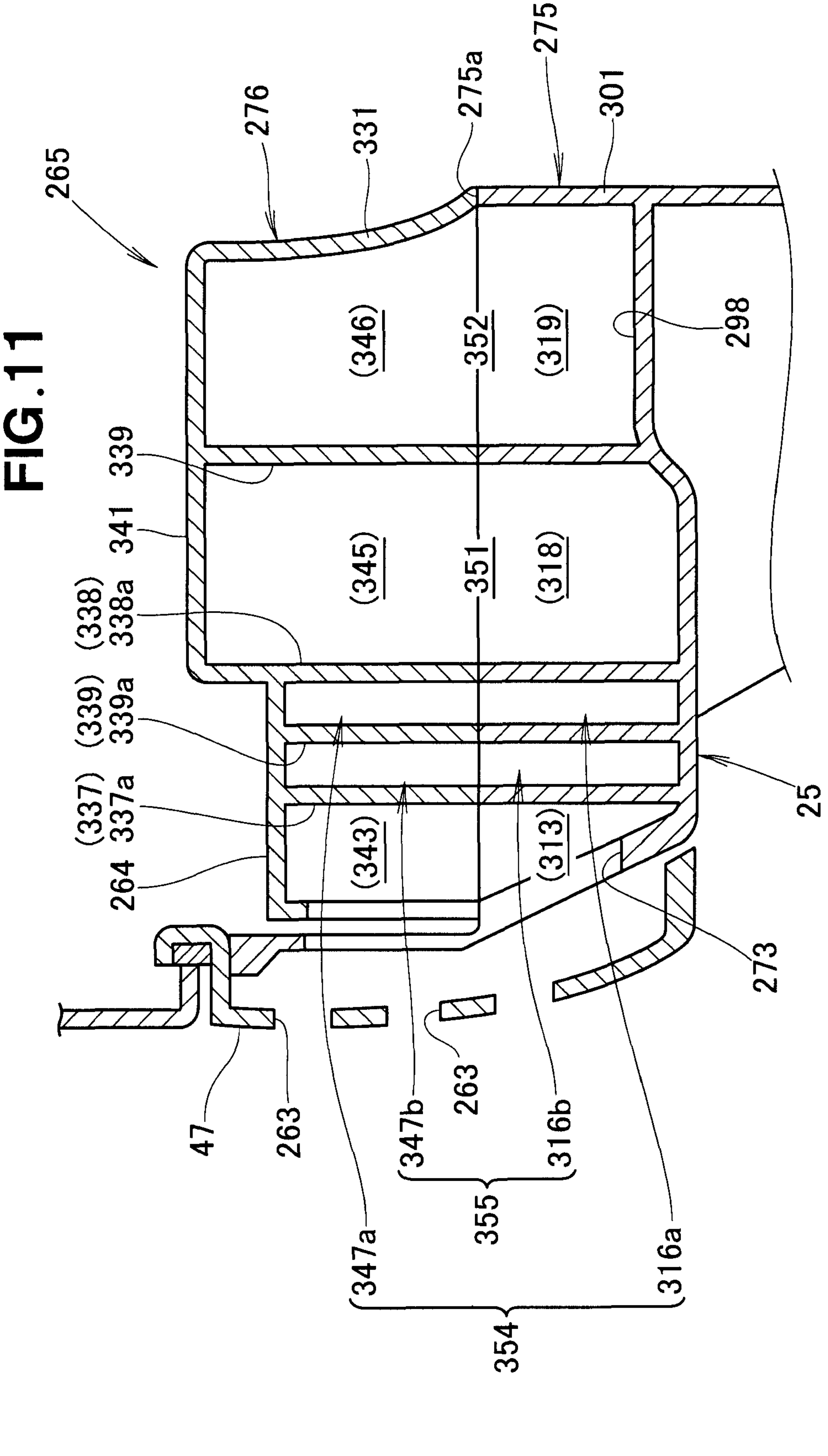
FIG. 11 is an enlarged view of area 11 of FIG. 10.

The first lower resonance chamber 318 forms a lower half section of a first resonance chamber (resonance chamber) 351 (see FIG. 11). The second lower resonance chamber 319 forms a lower half section of the second resonance chamber (resonance chamber) 352 (see FIG. 11).

A boss 321 is formed in a location that corresponds to substantially the center of the lower resonance chamber 314 of the third lower inside wall 309, and a screw hole 321*a* is formed in the boss 321. The cover section 276 is mounted on the partitioning wall section 275 by threadably inserting a bolt 323 into the screw hole 321*a*. An upper opening section 275*a* of the partitioning wall section 275 is blocked by the cover section 276.

With reference to FIGS. 9, 10, and 11, the cover section 276 is provided with an upper outside frame wall 331 formed so as to be superimposed on the lower outside frame wall 301 of the partitioning wall section 275, first to third upper inside walls 337 to 339 formed so as to be superimposed on the first to third lower inside walls 307 to 309, an upper wall 341 formed at the top of the upper outside frame wall 331, and the upper end opening 264*a* of the first intake channel 264 formed in the upper wall 341.

The cover section 276 is formed by the upper outside frame wall 331 and the upper wall 341 in a box shape having a lower opening 276*a*. The reference symbols 337*a* to 339*a* shown in FIG. 10 refer to the distal end sections of the first to third upper inside walls 337 to 339. The distal end sections 337*a* to 339*a* are superimposed on the distal end sections 307*a* to 309*a* of the first to third lower inside walls 307 to 309.

Additionally, the cover section 276 has a first upper intake channel 343 formed above the first lower intake channel 313 (FIGS. 8 and 11), a first upper resonance chamber (remaining part of the resonance chamber) 345 formed above the first lower resonance chamber 318, a second upper resonance chamber (remaining part of the resonance chamber) 346 formed above the second lower resonance chamber 319, a first communication upper space 347*a* formed above the first lower communication channel 316*a*, and a second communication upper space 347*b* formed above the second lower communication channel 316*b*.

The first upper resonance chamber 345 forms the upper half section of the first resonance chamber 351. The second upper resonance chamber 346 forms the upper half section of the second resonance chamber 352.

The first intake channel 264 is formed by the first lower intake channel 313 and the first upper intake channel 343 by blocking the upper opening section 275*a* of the partitioning wall section 275 with the cover section 276. The first resonance chamber 351 is formed by the first lower resonance chamber 318 and the first upper resonance chamber 345. The second resonance chamber 352 is formed by the second lower resonance chamber 319 and the second upper resonance chamber 346. A first communication channel 354 is formed by the first lower communication channel 316*a* and the first communication upper space 347*a*. A second communication channel 355 is formed by the second lower communication channel 316*b* and the second communication upper space 347*b*.

The first resonance chamber 351 is in communication with the first intake channel 264 by way of the first communication channel 354. The second resonance chamber 352 is in communication with the first intake channel 264 by way of the second communication channel 355. The first intake channel 264 is in communication with a plurality of intake ports 263 of the rear case section 47 by way of the lower end opening 273. Accordingly, outside air introduced from the intake ports 263 is directed to the first intake channel 264 by way of the lower end opening 273 of the first intake channel 264.

The lower end opening 266*a* of the second intake channel 266 is provided to the upper end opening 264*a* of the first intake channel 264. Accordingly, the outside air directed to the first intake channel 264 is directed to the air cleaner 267 by way of the second intake channel 266.

The first and second resonance chambers 351, 352 are in communication with the first intake channel 264 by way of the first and second communication channels 354, 355, respectively. Accordingly the intake noise of the outside air is muffled in the first and second resonance chambers 351, 352 when outside air is introduced from the intake ports 263.

As described above, the resonator 265 is provided with the partitioning wall section 275 having first and second lower resonance chambers 318, 319 that are in communication with the first intake channel 264, and the cover section 276 having the first and second upper resonance chambers 345, 346. The cover section 276 is superimposed on the partitioning wall section 275, whereby the first resonance chamber 351 is formed by the first lower resonance chamber 318 and the first upper resonance chamber 345 and the second resonance chamber 352 is formed by the second lower resonance chamber 319 and the second upper resonance chamber 346.

Part of the first and second lower resonance chambers 318, 319 can be formed using the bottom surface 298 of the bottom cover 25, and the resonator 265 can be made compact. Therefore, the space for accommodating the resonator 265 can be readily provided inside the case 17. The resonator 265 can furthermore be made more lightweight by forming a part of the first and second lower resonance chambers 318, 319 using the bottom cover 25.

In accordance with the resonator 265, intake noise is muffled in the first and second resonance chambers 351, 352 when outside air introduced from the intake ports 263 is directed to the first intake channel 264 by way of the lower end opening 273 and outside air inside the first intake channel 264 is directed to the air cleaner 267 by way of the second intake channel 266. Outside air directed from the air cleaner 267 is directed to the carburetor 101 by way of the third intake channel 268 and the intake joint section 271.

Next, the intake joint section 271 will be described with reference to FIGS. 12 and 13.

Figure 12:
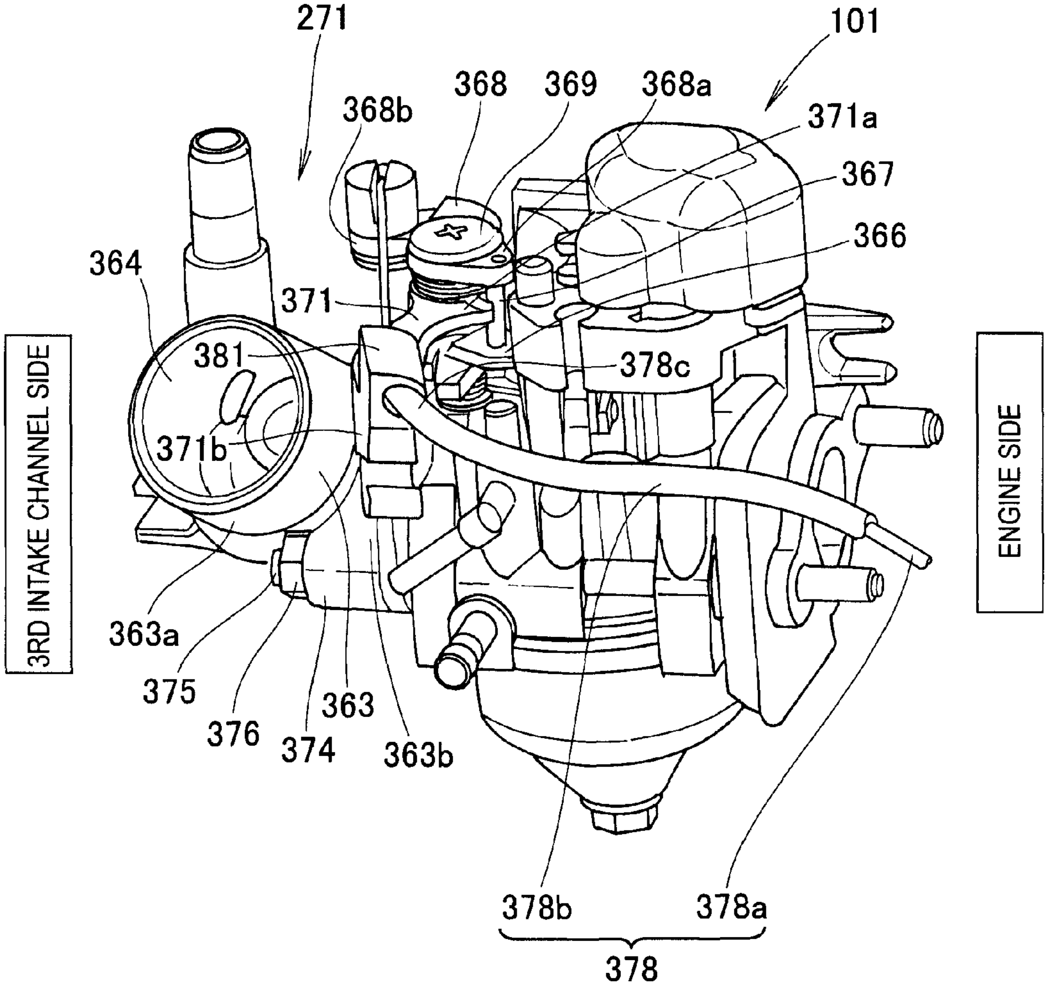
FIG. 12 is a perspective view showing a carburetor and an intake joint shown in FIG. 6.
Figure 13:
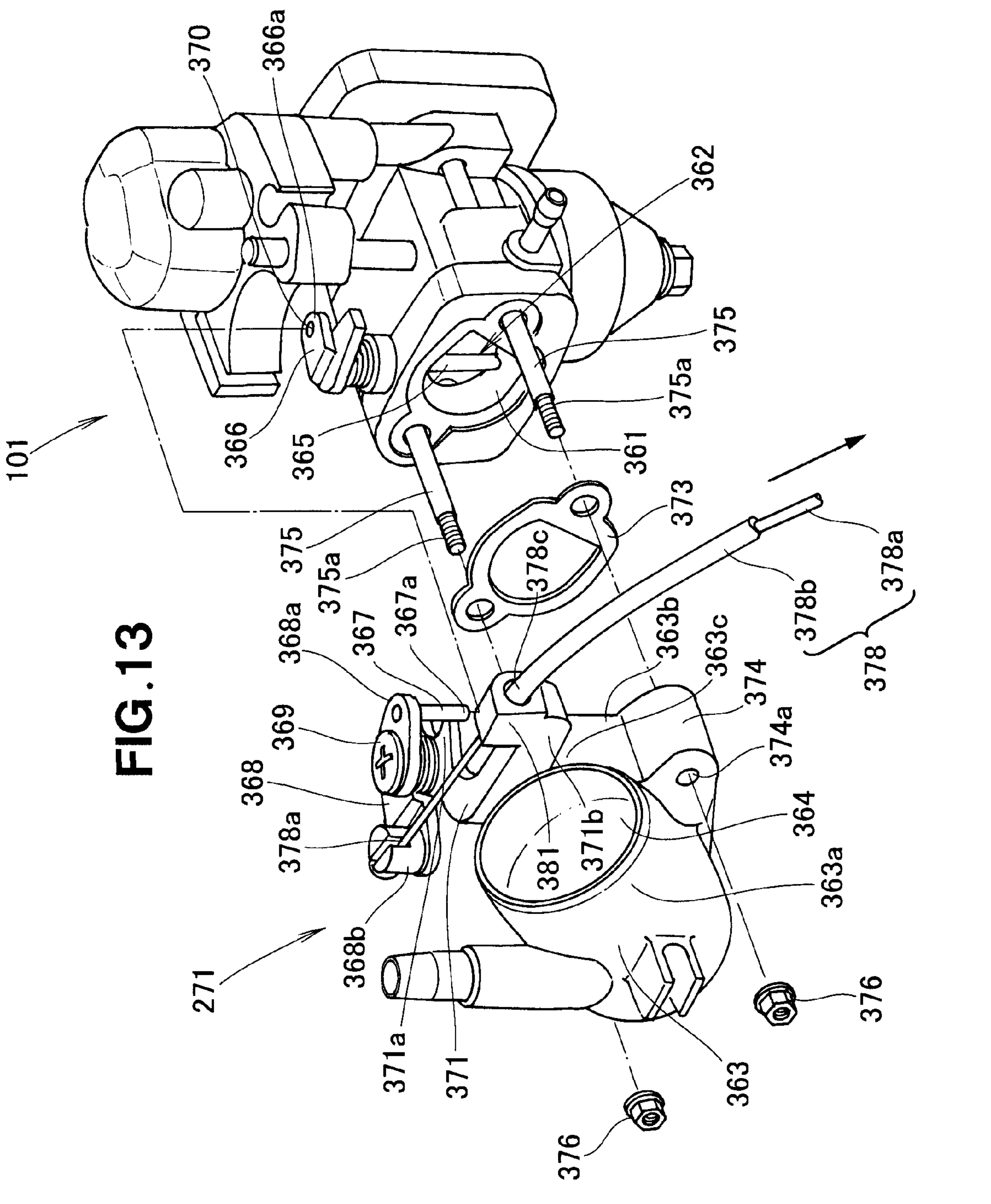
FIG. 13 is an exploded perspective view of the carburetor and intake joint of FIG. 12.

With reference to FIGS. 12 and 13, the carburetor 101 has a carburetor intake channel 361 for bringing outside air directed from the intake joint section 271 to the engine 21. A throttle valve (not shown) is provided to the carburetor intake channel 361, and a venturi (not shown) is provided to the upstream side of the throttle valve. A choke valve 362 is provided upstream of the venturi. The carburetor intake channel 361 is in communication with the third intake channel 268 (see FIG. 6) by way of a joint channel 364 of the intake joint section 271.

The choke valve 362 is a valve for choking the carburetor intake channel 361 on the upstream side of the venturi. A choke support shaft 365 of the choke valve 362 is rotatably supported in a state orthogonal to the carburetor intake channel 361. A driven lever 366 is provided to the upper end section of the choke support shaft 365, and a connection hole 370 is formed in a distal end section 366*a* of the driven lever 366.

Connection pin 367 extends downward from a control lever 368. The connection pin 367 is rotatably fitted into the connection hole 370, whereby the driven lever 366 and the control lever 368 are rotatably connected. The control lever 368 is rotatably provided to a choke stay 371 via a support shaft 369. The choke stay 371 is integrally formed with an elbow tube 363 of the intake joint section 271. Means for connecting the connection pin 367 to the driven lever 366 is described later.

The intake joint section 271 is disposed between the carburetor 101 and the lower end opening 268*b* (FIG. 6) of the third intake channel 268. An introduction-side end section 363*a* of the elbow tube 363 provided to the lower end opening 268*b* of the third intake channel 268. An outlet-side end section 363*b* of the elbow tube 363 is provided to the carburetor 101 via a gasket 373.

The intake joint section 271 is provided with the elbow tube 363 composed of resin molded in a curved shape, the choke stay 371 provided to the external peripheral wall of the elbow tube 363, and a pair of mounting sections 374 (the reverse side is not shown) provided to the outside wall of the elbow tube 363.

A bolt 375 is inserted into each through-hole 374*a* of the pair of mounting sections 374, and nut 376 is threadably coupled to the threaded sections 375*a* protruding from the through-holes 374*a*, whereby the elbow tube 363 is mounted on the carburetor 101.

The choke stay 371 is provided to an upper location 363*c* of the external peripheral wall of the elbow tube 363 in the vicinity of the outlet-side end section 363*b* of the elbow tube 363.

The choke stay 371 is formed substantially in a J-shape in a plan view, and the control lever 368 is rotatably mounted on one of the end sections 371*a* via the support shaft 369.

The connection pin 367 extends downward from an end section 368*a* of the control lever 368. A lower end section 367*a* of the connection pin 367 rotatably fitted into the connection hole 370 formed in the distal end section 366*a* of the driven lever 366.

On the other hand, a control cable 378 (inner cable 378*a*) is attached to the other end section 368*b* of the control lever 368. A distal end section 378*c* of an outer cable 378*b* of the control cable 378 is mounted on a cable support section 381. The cable support section 381 is integrally formed from a plastic material on the other end section 371*b* of the choke stay 371.

The inner cable 378*a* of the control cable 378 is pulled in the manner indicated by the arrow shown in FIG. 13, whereby the control lever 368 and the connection pin 367 rotate about the center of the support shaft 369. The connection pin 367 rotates, whereby the driven lever 366 rotates and adjusts the opening and closing of the choke valve 362.

The intake joint section 271 has a control lever 368 that can be provided to the choke stay 371 by integrally molding the elbow tube 363 and the choke stay 371 as described above.

The driven lever 366 is provided to the upper end section of the choke support shaft 365, and the connection hole 370 is formed in the distal end section 366*a* of the driven lever 366. The connection pin 367 extends downward from one end section 368*a* of the control lever 368. Accordingly, the connection pin 367 can be connected to the driven lever 366 in a simple manner merely by inserting the lower end section 367*a* of the connection pin 367 into the connection hole 370 of the driven lever 366. The control lever 368 can thereby be assembled in a simple manner with minimal effort when the intake joint section 271 is mounted on the carburetor 101.

Furthermore, the number of components of the intake joint section 271 can be reduced by integrally forming the choke stay 371 with the elbow tube 363. The elbow tube 363 and the choke stay 371 are molded from a plastic material, whereby the intake joint section 271 can be reduced in weight to a greater extent than when the elbow tube 363 and the choke stay 371 are formed from a metal material.

Next, an example for muffling the intake noise in the first and second resonance chambers 351, 352 of the resonator 265 will be described with reference to FIGS. 14 and 15.

Figure 14A:
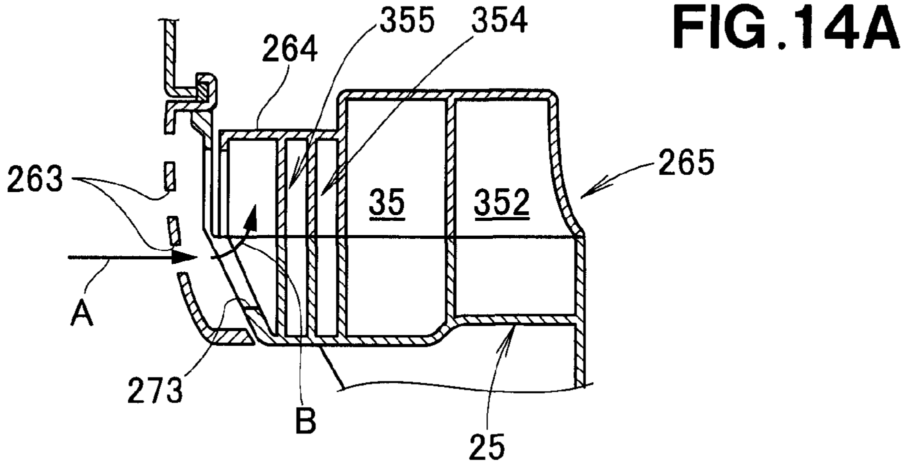
FIGS. 14A and 14B are views showing an example of taking in outside air into the air cleaner via a first intake channel of FIG. 9.

In FIG. 14A, the engine 21 (FIG. 2) is driven, whereby outside air passes through the intake ports 263 in the manner indicated by the arrow A. Outside air that has passed through the intake ports 263 is directed in the manner indicated by the arrow B to the first intake channel 264 by way of the lower end opening 273 of the first intake channel 264.

Figure 14B:
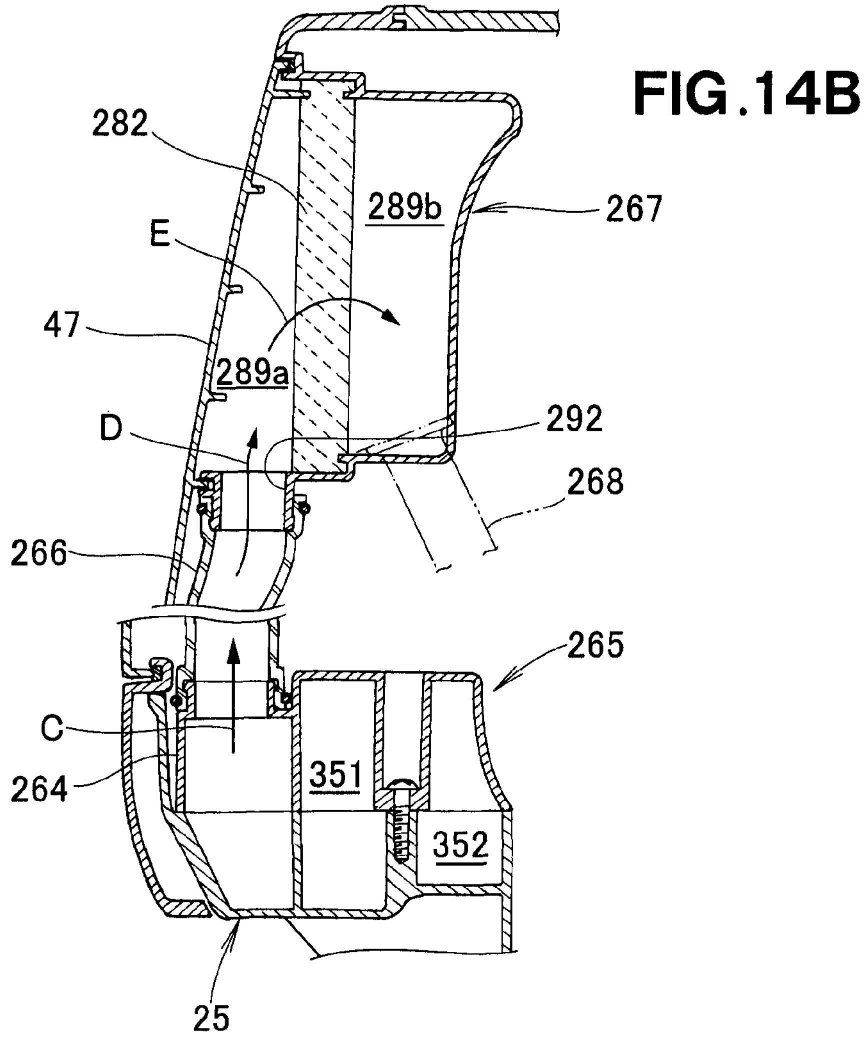

In FIG. 14B, outside air directed to the first intake channel 264 is directed in the manner indicated by the arrow C to the second intake channel 266. The outside air directed to the second intake channel 266 is directed in the manner indicated by the arrow D to the introduction space 289*a* of the air cleaner 267 by way of the outside-air intake port 292. Outside air directed to the introduction space 289*a* is filtered by the filter 282 and made to flow in the manner indicated by the arrow E to the outlet space 289*b*.

Outside air that has flowed to the outlet space 289*b* is directed in the manner indicated by the arrow F to the third intake channel 268 by way of the outside-air outlet 293, as shown in FIG. 15. Outside air directed to the third intake channel 268 is directed to the carburetor 101 by way of the intake joint section 271 shown in FIG. 13. Fuel fed from the venturi is mixed with outside air directed to the carburetor 101. The air-fuel mixture thus mixed is directed to the engine 21.

As shown in FIGS. 14A and 14B, the first and second resonance chambers 351, 352 are in communication with the first intake channel 264 by way of the first and second communication channels 354, 355, respectively. Accordingly, intake noise of the outside air can be muffled in the first and second resonance chambers 351, 352 when outside air is introduced to the engine 21 (FIG. 2) from the intake ports 263.

Next, an example of operating the choke valve 362 will be described with reference to FIG. 16.

In accordance with FIG. 16, the control lever 368 rotates in the manner indicated by the arrow H in the counterclockwise direction about the support shaft 369 by pulling the inner cable 378*a* of the control cable 378 in the manner indicated by the arrow G.

Connection hole 370 is formed in the distal end section 366*a* of the driven lever 366, and the lower end section 367*a* of the connection pin 367 is rotatably inserted into the connection hole 370. Accordingly, the control lever 368 rotates, whereby the connection pin 367 rotates in the manner indicated by the arrow I. Therefore, the driven lever 366 rotates together with the choke support shaft 365 in the manner indicated by the arrow J. The carburetor intake channel 361 on the upstream side of the venturi can be choked by the choke valve 362.

The shapes of the case 17, the rear casing section 47, the right-cover section 75, the air cleaner 267, the filter accommodation section 281, the filter 282, the filter accommodation space 289, the outside-air intake port 292, and the like are not limited to the shapes described in the example above and can be suitably modified.

The present invention is advantageously applied to an engine generator provided with an air cleaner inside a case for accommodating an engine and a generator.

Obviously, various minor changes and modifications of the present invention are possible in light of the above teaching. It is therefore to be understood that within the scope of the appended claims the invention may be practiced otherwise than as specifically described.

What is claimed is:

1. An engine generator, comprising:
- an engine;
- a generator driven by the engine;
- a case in which the engine and the generator are disposed; and
- an air cleaner for taking outside air into the case and performing filtering in order to direct the air to the engine,
- wherein the air cleaner comprises:
  - a filter accommodation section having a space defined by a portion of a wall section of the case dented in an internal direction of the case, the space having an opening that opens toward an exterior of the case;
  - a filter accommodated in the space;
  - an outside-air intake port for introducing outside air into the filter accommodation section, said outside-air intake port opening into the filter accommodation section at a point entirely below the filter; and
  - an air cleaner cover for blocking the opening of the filter accommodation section.

2. The engine generator of claim 1, wherein the filter accommodation section is integrally formed in the wall section of the case.

3. The engine generator of claim 1, wherein the space of the filter accommodation section is defined by an upper wall section, a lower wall section, a left wall section, a right wall section and a bottom wall section to have a rectangular shape.

4. The engine generator of claim 1, wherein the filter accommodation section has an outside-air outlet for directing outside air filtered by the filter to the engine.

5. The engine generator of claim 4, wherein the filter is disposed between the outside-air intake port and the outside-air outlet.

* * * * *